United States Patent Office 3,225,014
Patented Dec. 21, 1965

3,225,014
ETHYLENE DICARBOXYLIC ESTERS OF
1,2 ALKANE KETALS
Gaetano F. D'Alelio, South Bend, Ind., assignor to Scott
Paper Company, Philadelphia, Pa., a corporation of
Pennsylvania
No Drawing. Filed July 9, 1962, Ser. No. 208,592
17 Claims. (Cl. 260—78.4)

This invention is concerned with new monomeric esters of ethylene dicarboxylic acid and polymers and copolymers derived therefrom. Specifically it relates to ethylene dicarboxylic esters of the general formula

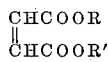

in which R represents H, a saturated aliphatic hydrocarbon radical, an olefinic unsaturated hydrocarbon radical, said radicals containing one to eight carbon atoms, and R'; R' represents an alkylene dioxolane radical of the structure

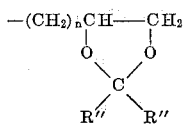

wherein $n$ is an integer having a value of one to four and R'' represents an alkyl radical containing one and two carbon atoms, for example, methyl and ethyl radicals. The new monomeric esters of this invention are the 1,2 ethylene dicarboxylic acid esters of the alpha, beta cyclic ketals of alpha, beta, omega alkane triols containing three to six carbon atoms in the alkane chain having the formula

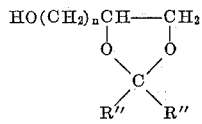

wherein $n$ is an integer having a value of one to four. Thus, the new monomers of this invention are the esters of the 1,2 ketals of 1,2,3 propane triol; 1,2,4 butane triol; 1,2,5 pentane triol; and 1,2,6 hexane triol. The 1,2 ethylenic dicarboxylic acid esters of this invention are derivataives of maleic and fumaric acids.

Maleic and fumaric acids are dicarboxylic acids, and accordingly mono- and di-esters of the alcohols

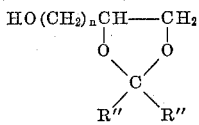

may be prepared and utilized in the practice of this invention.

Because of commercial availability and other economic factors, the maleic and fumaric esters of 1,2 ketal of 1,2,3 propane triol, corresponding to the formula

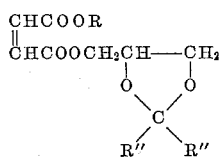

are preferred.

In the monoesters, the remaining carboxylic group may be left unesterified or may be converted to another ester group containing one to eight carbon atoms as represented by R hereinabove. Illustrative examples of the aliphatic hydrocarbon radical R containing one to eight carbon atoms are methyl, ethyl, propyl, butyl, amyl, hexyl, heptyl and octyl, which may be linear or branched, such as isopropyl, secondary butyl, isoamyl, secondary octyl, or may be unsaturated as vinyl, isopropenyl, allyl, methalyl, buten-2-yl-4, penten-2-yl-4, 5 methyl penten-1-yl-5, 4 ethyl hexen-1-yl-4, 4 methyl hepten-1-yl-4, octen-1-yl-8, etc.

The esters of this invention can be prepared by a number of methods. One convenient method is to use maleic anhydride and the desired alcohol in accordance with the reaction

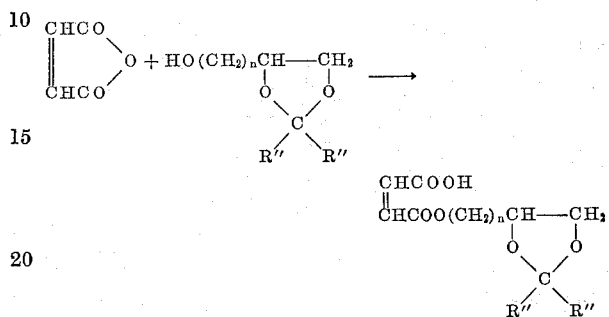

This esterification reaction using the anhydride may be performed simply by melting together the two reactants; but preferably to avoid ketone elimination or other side reactions, the esterification is performed in an inert solvent such as heptane, hexane, benzene, toluene, dioxane, tetrahydrofurane, etc., and isolating the product. The monoester thus formed can be used as such for the preparation of polymers and copolymers, or may be used as an intermediate in the preparation of diesters by conversion to an alkali metal salt, such as the sodium, potassium, lithium salt, etc., and reacting the salt with a dialkylsulfate, thus

The new esters of this invention can be prepared also from maleic and fumaric acids, or the lower alkyl esters thereof, and the cyclic ketal of the alkane triol desired in accordance with the general reaction:

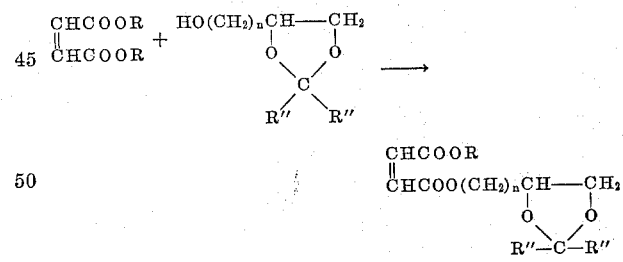

and

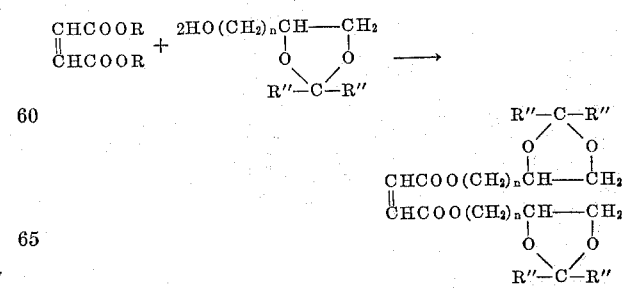

The preferred embodiment of R is methyl and ethyl in this reaction. Alternately, the mono- and di-acid chloride of the dicarboxylic acids can be used in preparing the new monomers, in the presence of a hydrohalide acceptor (HAC), such as tributyl amide, sodium carbonate, etc., thus

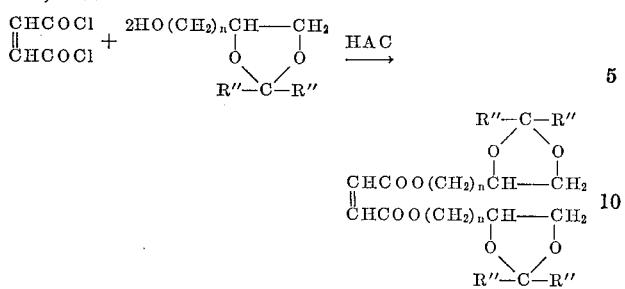

and

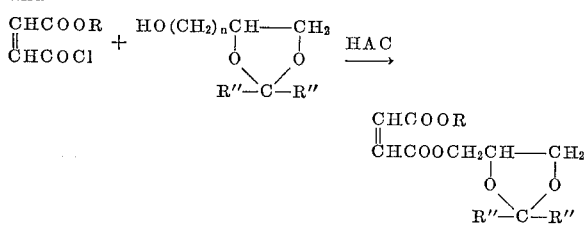

The specific method used in the preparation of the monomer depends in most cases on the monomer desired; for example, when the acid monoester is desired, the method using the anhydride is preferred; when a symmetrical diester is desired then either the acid dichloride and the dimethyl or the diethyl ester is reacted with the cyclic ketal of the alkane triol, and when a mixed ester, that is, maleic or fumaric ester containing a lower alkyl group together with the cyclic ketal ester groups is desired, then the lower alkyl monoester acid chloride, or a lower alkyl diester is reacted with the cyclic ketal of the triol as indicated in the reactions hereinabove.

The esters of this invention are polymerizable monomers possessing a polymerizable $$-O\overset{O}{\overset{\|}{C}}-CH=CH-\overset{O}{\overset{\|}{C}}O-$$

structure and may be polymerized to form homopolymers, or copolymers from a mixture of two or more of these esters, or copolymers from one or more of these new esters with other monomers containing a vinyl, $CH_2=CH-$, a vinylidene, $CH_2=C<$, or a vinylene group

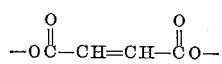

Illustrative examples of other monomers containing such groups are the acrylic esters such as methyl acrylate, ethyl acrylate, hexyl acrylate, allyl acrylate, phenyl acrylate, benzyl acrylate, methyl-alpha-chloroacrylate, etc.; the methacrylic esters such as methyl methacrylate, ethyl methacrylate, propyl methacrylate, methallyl methacrylate, ethylene dimethacrylate, etc.; the vinyl esters such as vinyl chloride, vinyl acetate, vinyl stearate, vinyl benzoate, vinyl chloroacetate, divinyl phthalate, divinyl succinate, etc.; the polymerizable amides and nitriles such as acrylamide, hydroxymethylacrylamide, methacrylamide, itaconic monoamides, itaconic diamide, acrylonitrile, methacrylonitrile, etc.; the alkenyl aryl compounds such as styrene, o-methyl styrene, p-methyl styrene, alpha-methyl styrene, the chloro-styrenes, divinyl benzene, diallyl benzene, etc.; the mono- and polyallyl esters such as allyl acetate, diallyl succinate, diallyl phthalate, diallyl maleate, diallyl fumarate; the vinylidene compounds such as vinylidene chloride, vinylidene cyanide, methylene malonic esters, etc.; vinylene compounds such as vinylene carbonates, maleic anhydride, maleic monoesters and maleic diesters; the itaconic compounds such as itaconic anhydride, the itaconic mono- and the itaconic diesters of the lower and higher aliphatic alcohols; the dienes such as butadiene, isoprene, 2-chloro-butadiene 1,3 etc. The proportion of the new monomers in copolymers with other monomer will depend, in accordance with the accepted principles of copolymerization, on the reactivity and selectivity constants of the comonomers used in preparing the copolymer, the ratio of the monomers used and the extent of conversion. However, by selecting appropriate conditions for the copolymerization, copolymers, using the new monomers of this invention, can be made to contain effective and small amounts of these new monomers, for example, of the order of from 0.1% to 0.5% to very high amounts of the order of 99.5% to 99.9% in the final polymer products.

The new monomers of this invention can be polymerized by the known methods used to polymerize acrylic, methacrylic or maleic monomeric compounds. The new monomers, in the presence or absence of other polymerizable $>C=C<$ containing monomers, can be polymerized in bulk, solution, emulsion, or suspension with or without polymerization initiators and other modifiers. As polymerization initiators there can be used the per-compounds, such as potassium persulfate, tertiary butyl peracetate, benzoyl peroxide, cumene hydroperoxide, tertiary butyl peroxide, tertiary butyl perbenzoate, hydrogen peroxide with or without ferrous salts, etc.; the azo catalysts such as alpha,alpha'azobis(isobutyronitrile), ultraviolet light in the absence or presence of ketones, ionizing radiation from X-rays, electron and particle accelerators, cobalt 60 sources, etc.

In solution polymerization the medium can be selected from solvents which retain the polymer in solution throughout the polymerization, or can be chosen so that the polymer precipitates when formed and can be selected from the class of aliphatic, cycloaliphatic and aromatic hydrocarbons, esters, ethers, ketones, halogenated hydrocarbons, etc., or mixtures thereof depending on the form in which the polymer is desired. When halogenated hydrocarbons are used they also act as modifiers of the polymerizations. In emulsion polymerization, the emulsifying agent to be used in the aqueous system is selected from the class of fatty acid soaps, salts of sulfonated alkyl benzenes, polyvinyl alcohol, gelatin, polyacrylic acid, salts of styrene-maleic acid polymers, gelatin and the like, which can be used alone or with buffering agents such as sodium acetate, borax, trisodium phosphate and the like. In suspension polymerization, the dispersion agent can be selected from the class of insoluble inorganic carbonates, phosphates and silicates to be used alone or in the presence of minor amounts of deflocculating agents such as sodium dodecylbenzene sulfonate or potassium stearate.

The new monomers and polymers of this invention have new and valuable properties which are attributable to the cyclic ketal structure. The monomers of this invention have a high absorption in the ultraviolet light region, that is, the U.V. transmission is very low in the region of 500 to 5000 Angstroms. This absorbed energy, corresponding from about 4.1 to about 40 electron volts, produces secondary effects, which are useful in producing crosslinked polymers. While the exact mechanism is not exactly understood it is believed that the ultraviolet radiation generates radicals in the system by opening of the ketal ring thus

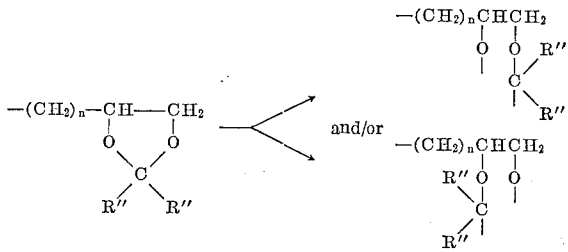

and that these radical structures are responsible for the cross-linking. In photochemical reactions of this type normally one pair of radicals is generated for each photon absorbed. However, due to other reactions the quantum yield may be reduced to 0.5 or even less. The reactivity of the compounds of this invention is readily observable.

When monomeric methyl acrylate is polymerized for one hour with a U.V. source from a mercury lamp emitting 17,000 photons per hour, only a soluble fusible polymer is obtained, whereas if a monomeric mixture of 80 parts of methyl acrylate and 20 parts of

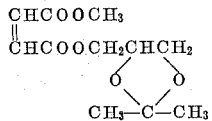

are polymerized under the same conditions, infusible insoluble polymers can be isolated. If instead of the ketal, dimethyl or diethyl or dipropyl maleate is used, then only soluble fusible polymers are obtained, indicating that the ketal structure is the photoreactive responsive grouping. In a similar manner it can be demonstrated that polymers of the normal alkyl esters of maleic and fumaric esters are not as repsonsive to U.V. light as fumaric and maleic esters containing the ketal structures of this invention.

The following examples illustrate the synthesis of the monomers, polymers, and copolymers of this invention and are not given by way of limitation but way of illustration. The parts and percentages given are parts and percentages by weight unless otherwise specified.

*Example I*

There were combined in 200 parts of benzene, 27.5 parts of maleic anhydride, and 37.0 parts of glyceryl ketal

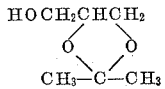

in a reaction vessel equipped with stirrer, condenser, and heating means, and the mixture heated at 60° C. for 48 hours, or at reflux for 15 hours, following which it is cooled to room temperature. The desired ester on evaporation of the solvent under reduced pressure remains as a colorless or light colored oil in an almost quantitative yield. The crude ester has a refractive index of $n_D^{20} = 1.6897$.

Elemental analysis for C and H gives values of 51.7% and 6.08% respectively, which is in excellent agreement with the calculated values of 52.2% and 6.46% respectively, for the compound, 4-(2,2-dimethyl-dioxalone-1,3) methylene hydrogen maleate, corresponding to the formula of

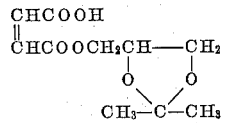

*Example II*

The procedure of Example I is repeated using an equivalent amount of the 1,2 ketal of 1,2,6 hexanetriol instead of glyceryl ketal, and there is obtained the corresponding maleate of the formula

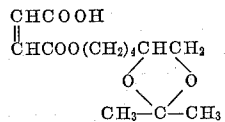

which on analysis for C and H and acid number determination give values in close agreement with the theoretical values for the compound.

*Example III*

In a well-stirred reaction vessel containing 200 parts of benzene and 23.0 parts of the monomer of Example I is added 4.0 parts of NaOH in 50 parts of ethyl alcohol to form the sodium salt. To this mixture is added slowly over a period of one hour 12.6 parts of dimethyl sulfate and the mixture heated at 60–70° C. for two hours, following which it is allowed to cool at room temperature and filtered to remove solid salts. The benzene solution is washed with dilute aqueous sodium carbonate solution and with distilled water until neutral; then dried with anhydrous sodium sulfate which is removed by filtration. The benzene solution containing the crude desired ester is treated with activated carbon, filtered and concentrated at a reduced pressure of 15–30 mm., leaving the ester as a colorless viscous oil at which pressures the oil cannot be distilled without the pyrolytic elimination of $CH_3COCH_3$ and other products. Elemental analysis of the viscous oil gives values of 53.82% C and 6.48% H, which is in good agreement with the calculated values of 54.09% C and 6.55% H for the compound

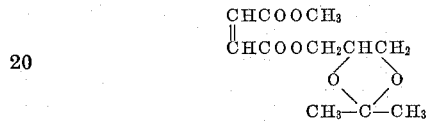

When an equivalent amount of diethyl sulfate is used instead of dimethyl sulfate in this procedure, then the corresponding ethyl ester is obtained, as

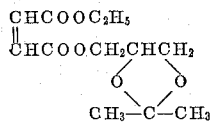

*Example IV*

To a reaction vessel equipped with stirrer, condenser and inlet containing 1600 parts of benzene, 264 parts of glyceryl ketal, and 205 parts of triethyl amine and cooled to 0.5° C. is slowly added over a period of five hours 153 parts of fumaryl chloride in 135 parts of benzene, following which the reaction mixture is allowed to come to room temperature during a period of five hours. The mixture is filtered to remove $(CH_2)_3N \cdot HCl$ and the filtrate washed with dilute aqueous $Na_2CO_3$ solution until slightly alkaline and then with distilled water until neutral. The benzene solution of the ester is dried overnight with anhydrous $Na_2CO_3$, filtered and the filtrate separated from benzene by distillation under reduced pressure, leaving a clear viscous oil which cannot be distilled at 10 mm. without evidence of the pyrolytic elimination of $CH_3COCH_3$ and other products. Elemental analysis of the residual oil gave values for C and H of 55.4% and 6.68% respectively, which is in good agreement for the calculated values of 55.8% and 6.95% for the compound

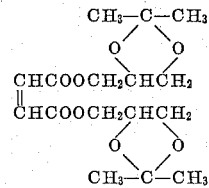

When the glyceryl ketal of this example is replaced by an equivalent amount of the homologous ketals, such as

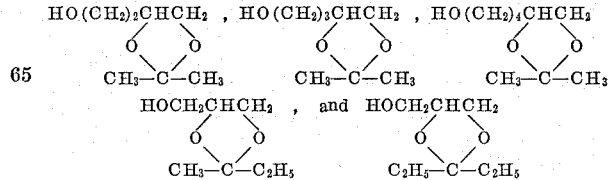

then the corresponding fumaric diesters are obtained.

*Example V*

To a reaction vessel equipped with a stirrer, condenser, and inlet is added 1000 parts of toluene, 98 parts of maleic anhydride, and 130 parts of octyl alcohol and the mixture reacted at reflux for five hours to produce the octyl hemimaleate

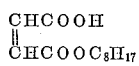

To the reaction mixture then is added 119 parts of thionyl chloride and reflux continued until $SO_2$ and HCl are no longer liberated from the reaction, leaving by isomerization the fumaryl acid chloride

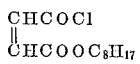

in solution. The reaction solution is cooled to 0–5° C., and there is added slowly over a period of five hours a mixture of 101 parts of triethyl amine and 133 parts of glyceryl ketal in 200 parts of ethyl ether, following which the mixture is allowed to come to room temperature. The mixture is then filtered to remove $(CH_2)_3N \cdot HCl$, washed and dried according to the procedure of Example IV, after which the solvent is removed by distillation under reduced pressure, leaving a clear viscous oil which is not distillable at 5 mm. pressure without evidence of pyrolytic eliminations. Elemental analysis for carbon and hydrogen gives values of 63.08% and 8.76% respectively, which is consistent with the formula

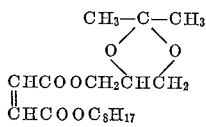

When an equivalent amount of allyl or methallyl alcohol is used in the procedure of this example, instead of octyl alcohol, then the corresponding allyl and methallyl esters

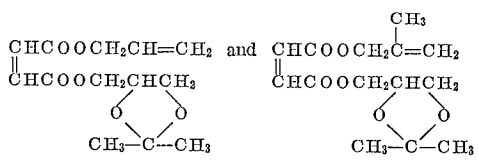

respectively, are obtained.

The copolymerization of the monomers of this invention is illustrated by the use of the maleyl ester of glyceryl ketal of Example I, with a number of monomers such as styrene, vinyl acetate, methylacrylates and methyl methacrylates as examples of monomers containing a $CH_2=C<$ group.

*Example VI*

Styrene and the maleyl ester of glyceryl ketal, were mixed in the mole ratios 0.4:1, 0.5:1, 0.6:1, 0.86:1, 1:1, 3:1, 7:1, 10:1, and 15:1 respectively, and sufficient purified acetone added to produce a 20% solution of monomers in solvent. The mixtures were polyzerized at 60° C. for 72–96 hours using an amount of benzoyl peroxide equivalent to 0.25% by weight of the monomer as the catalyst, following which they are precipitated by addition of the solution to methanol, isolated by filtration, and dried. The copolymers obtained from these various ratios were soluble in a variety of solvents such as acetone, dioxane, toluene, dimethyl formamide, dimethyl sulfoxide, ethylene carbonate, etc., and can be cast into clear colorless films; but when heated at elevated temperatures from 160–200° C. for various periods of time, crosslinked polymeric compositions are obtained. When the clear unheated films are subjected to the ultraviolet radiation of a mercury lamp for 10–20 minutes, then insoluble films are obtained.

*Example VII*

Vinyl acetate and the maleate ester of glyceryl ketal are mixed in the mole ratios of 0.35:1, 0.5:1, 0.65:1, 0.90:1, 1:1, 3:1, 7:1, 10:1, and 15:1 and sufficient acetone added to produce a 20% solution of monomer in the solvent. The mixtures were polymerized at 50–60° C. using 1.25% 2,2'-azo-bis-(isobutyronitrile) as the catalyst, and soluble, fusible polymers are obtained which can be crosslinked on heating and by exposure to utraviolet light similarly to the polymers of Example VI.

*Example VIII*

Methyl acrylate and the maleate are copolymerized in the mole ratios of the procedure of Example VI and colorless, curable copolymers are similarly obtained.

*Example IX*

Methyl methacrylate and the maleate are copolymerized as in Example VIII and clear, colorless copolymers having properties related to the acrylate copolymers are obtained.

As illustrated by the range of ratios of the above various monomer pairs, copolymers of a wide limit of compositions can be readily prepared according to the standard procedures known in the art.

*Example X*

As an illustration of solution copolymerization, 95 parts of styrene, 5 parts of the monomer of Example III

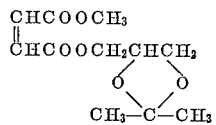

and 200 parts of toluene containing one part of 2,2'-azo-bis-isobutyronitrile are heated in a reactor at 75–80° C. for 36 hours, producing a clear colorless polymer solution useful directly as a coating composition which can be converted to an insoluble product by heating to temperatures of 150–165° C. A copolymer suitable for molding can be isolated from the toluene solution by precipitation with methyl alcohol.

*Example XI*

The following example illustrates an emulsion polymerization. Vinyl acetate 90 parts, 10 parts of

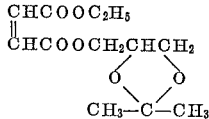

the monomeric ethyl ester of Example III, 100 parts of water containing 1.5 parts of polyvinyl alcohol and 0.5 parts of potassium sulfate are heated in a suitable reactor at 75–80° C. for 12 hours producing a latex which can be used directly as an adhesive.

*Example XII*

Thirty parts of

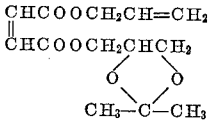

the monomeric allyl ester of Example V, one part of benzoyl peroxide are mixed and heated at 80° C. for 24 hours, producing a thick viscous polymer which, on continued heating at 80° C. for 100 hours, becomes insoluble and infusible. The intermediate viscous polymer is suitable as a casting resin.

*Example XIII*

Five parts of methyl acrylate and 1.0 part of

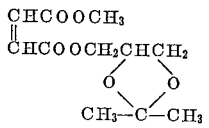

are mixed and irradiated with U.V. light of a mercury lamp for four hours, and a polymer, insoluble in benzene, is obtained.

From the foregoing examples it may be seen that the new monomers of this invention are quite versatile, their inherent characteristics enabling the production of a wide range of polymers and copolymers. By varying the conditions of polymerization, such as the nature of the catalyst, as well as its concentration, the temperature of polymerization, the choice of the medium, if any, in which the polymerization is performed, and the selection of, as well as the ratio of monomeric compounds employed, the physical and chemical properties of the utilimate polymer can be controlled. Additionally as has been pointed out hereinabove these new monomers contain a >C=C< grouping permitting polymerization by the regular procedures used in polymerizing acrylic, maleic or fumaric monomers; moreover, since they contain a cyclic ketal structure, they can undergo secondary reactions utilizing the ketal ring independently of the >C=C< grouping. This secondary reaction may involve crosslinking of the monomeric structures but it is also possible for a ketone to be eliminated from the monomer on heating. In the absence of other reagents which modify the course of the reaction; the neutral esters of this invention such as

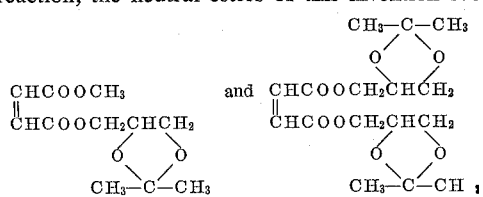

begin to evolve ketones noticeably in the temperature range of 200–210° C., whereas if one of the carboxyl groups is left unesterified, for example as in

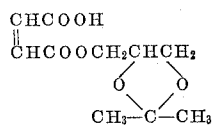

the elimination is noticeable in the temperature range of 140–150° C.; and this reaction is probably due, and favored by, the transesterification of the free-COOH group with the cyclic ketal ring

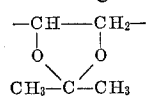

The variation in temperature required to effect crosslinking is carried into the polymers and copolymers of the monomers of this invention when they contain a free carboxylic group. This phenomenon is also observed when the carboxyl group is not part of the new monomer but is present as an element of a \CH=C< containing monomer such as acrylic acid, methacrylic acid, itaconic acid, itaconic acid monoester, maleic acid, fumaric acid, maleic acid monoester which has been copolymerized with the neutral, or di-esters of this invention. It was also discovered, in the use of the new monomers and polymers of this invention, that the temperature of ketone elimination could be greatly reduced in the presence of chemical modifiers such as acid and salts, e.g., H₃PO₄, Na₂CO₃, NaHCO₃, ZnCl₂, FeSO₄, etc. As illustrative of this improvement, the addition of 1% ZnCl₂ to

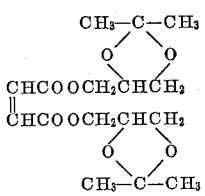

can reduce the elimination temperature from about 200° C. to about 120° C. These modifiers thereby increase the utility of the monomers and polymers of this invention by avoiding thermal pyrolysis of the compounds through lowering of the temperature required to produce a crosslinked polymer. Though the monomers of this invention are particularly useful in the preparation of polymers for the coating, laminating, and molding polymer arts (they are useful in themselves as photosensitizing agents to be added alone or with modifiers to other preformer polymers, as hydrohalide acceptors for polyvinyl halide type polymers and as chemical intermediates for reactions with amine, amides, and ureas.

It will be obvious that variations in the component elements of the newly discovered compounds, the manner of their preparation and utilization are possible without departing from the spirit of my invention or the scope of the appended claims.

What I claim is:

1. As new compounds, monomeric esters having the general formula

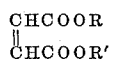

in which R is a member of the class consisting of H, saturated and olefinic unsaturated aliphatic hydrocarbon radicals containing from one to eight carbon atoms and at least one R', and R' represents

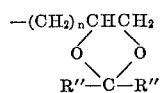

in which $n$ is an integer having a value of from 1 to 4 inclusive, and R'' is a member of the group consisting of methyl and ethyl radicals.

2. A monomer having the formula

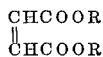

in which R is a member of the class consisting of H, saturated and olefinic unsaturated aliphatic hydrocarbon radicals containing from one to eight carbon atoms and R', and at least one R' represents

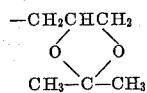

3 A monomer having the formula

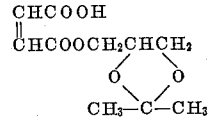

4. A monomer having the formula

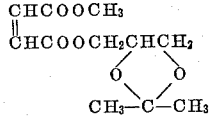

5. A monomer having the formula

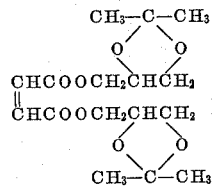

6. The polymerization product of a monomer of claim 1.

7. The polymerization product of a monomer of claim 2.

8. The polymerization product of a monomer of claim 3.

9. The polymerization product of a monomer of claim 4.

10. The polymerization product of a monomer of claim 5.

11. A copolymer of a monomer of claim 1 and at least one other compound containing a $CH_2=C<$ group.

12. A copolymer of a monomer of claim 2 and at least one other compound containing a $CH_2=C<$ group.

13. A copolymer of the monomer of claim 3 and at least one other compound containing a $CH_2=C<$ group.

14. A copolymer of the monomer of claim 4 and at least one other compound containing a $CH_2=C<$ group.

15. A copolymer of the monomer of claim 5 and at least one other monomer containing a $CH_2=C<$ group.

16. A copolymer as defined in claim 12 in which the $CH_2=C<$ compound is styrene.

17. A copolymer as defined in claim 13 in which the $CH_2=C<$ compound is styrene.

References Cited by the Examiner

UNITED STATES PATENTS

| | | | |
|---|---|---|---|
| 2,397,602 | 4/1946 | Gresham | 260—78.4 |
| 2,680,735 | 6/1954 | Fegley et al. | 260—86.3 |
| 3,010,923 | 11/1961 | Ikeda | 260—78.4 |

JOSEPH L. SCHOFER, *Primary Examiner.*

DONALD E. CZAJA, *Examiner.*